United States Patent [19]

Popjoy

[11] Patent Number: 4,989,700
[45] Date of Patent: Feb. 5, 1991

[54] GAS SPRING WITH AN ANTI-RATTLE PISTON ASSEMBLY

[75] Inventor: Mark Popjoy, Lansdale, Pa.
[73] Assignee: Fichtel & Sachs Industries, Inc., Colmar, Pa.
[21] Appl. No.: 458,306
[22] Filed: Dec. 28, 1989
[51] Int. Cl.⁵ ............................................. F16F 9/36
[52] U.S. Cl. ............................... 188/322.18; 267/129
[58] Field of Search ............... 188/282, 300, 317, 320, 188/322.15, 322.18; 267/124, 127, 129; 296/56

[56] References Cited

U.S. PATENT DOCUMENTS

| 374,080 | 11/1887 | Nickerson . | |
|---|---|---|---|
| 1,616,091 | 2/1927 | Scott . | |
| 3,837,445 | 9/1974 | Pierle . | |
| 3,976,287 | 8/1976 | Kendall et al. | 267/139 |
| 3,991,862 | 11/1976 | Tanabe | 188/282 |
| 4,438,833 | 3/1984 | Schafer | 188/320 |
| 4,466,514 | 8/1984 | Molders et al. | 188/320 |
| 4,467,899 | 8/1984 | Molders et al. | 188/320 |
| 4,809,828 | 3/1989 | Nakazato | 188/322.15 |

FOREIGN PATENT DOCUMENTS 2587773  3/1987  France ........................... 188/322.18

Primary Examiner—Duane A. Reger
Attorney, Agent, or Firm—Brumbaugh, Graves, Donohue & Raymond

[57] ABSTRACT

Rattling of the piston against the tube in a gas spring due to transient lateral loads on the piston are inhibited by engagement of the base of the piston ring groove with internal projections of a serrated inner edge of the sealing ring. Assurance against seizure of the sealing ring to the piston and preservation of a minimum width of the face seal between the sealing ring and the ringland to ensure against leakage are provided.

5 Claims, 1 Drawing Sheet

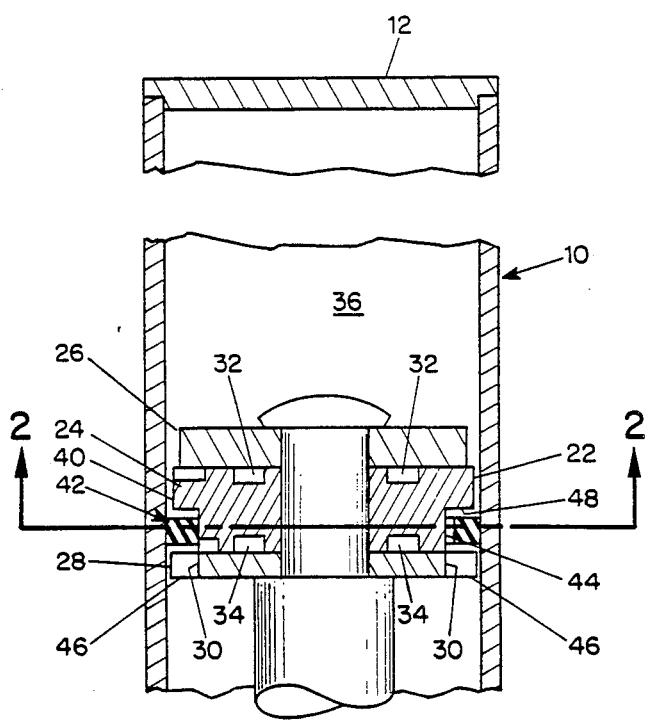
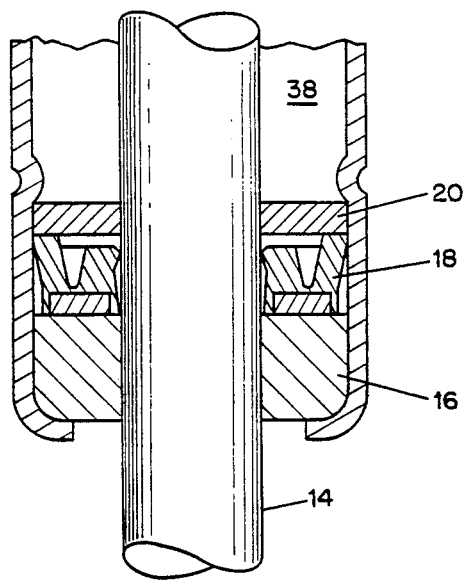
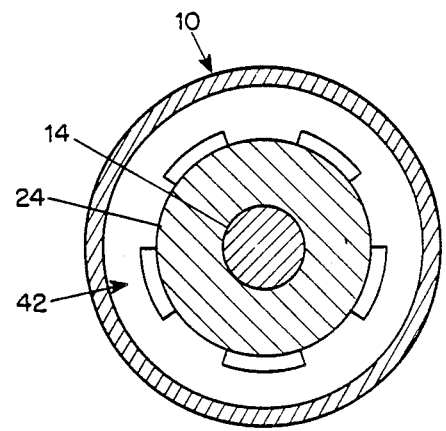
FIG. 2
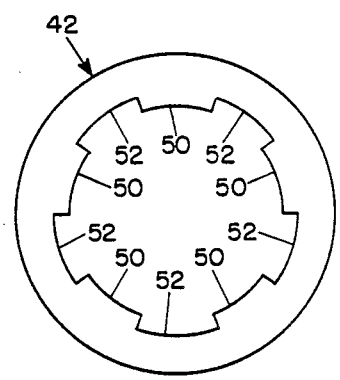
FIG. 3
FIG. 1

GAS SPRING WITH AN ANTI-RATTLE PISTON ASSEMBLY

FIELD OF THE INVENTION

The present invention relates to a gas spring of the type used to lift and partially or wholly counter-balance a load and, in particular, a gas spring having an anti-rattle piston unit.

BACKGROUND OF THE INVENTION

Gas springs are widely used in automotive vehicles to lift and partly or wholly counterbalance engine compartment hoods, trunk lids, tail gates and the like (hereinafter referred to as "loads"). To prevent the loads from moving toward open at an undesirably rapid speed, most gas springs used in automotive and similar applications incorporate a dampening feature in the form of a piston unit having a restrictive bypass that throttles the flow of fluid across the piston unit when the piston rod is moving out to lift the load. At the same time it is usually desirable to have an open bypass across the piston unit when the load is being moved toward closed in order to keep the handle load low. Gas springs having a restricted bypass that operates when the piston rod moves out and an open bypass that operates when the piston rod moves in are described and shown in U.S. Pat. Nos. 4,438,833 (Schäfer, Mar. 27, 1984), 4,466,514 (Mölders et al., Aug. 21, 1984), and 4,467,899 (Mölders et al., Aug. 28, 1984).

The gas springs of those patents comprise an elongated tube that is closed at one end and receives a piston rod in sealed and sliding relation at the other end and a piston unit affixed to the piston rod within the tube and defining a closed end chamber within the tube adjacent said one end and a rod end chamber within the tube adjacent said other end. The tube contains a gas at a pressure greater than atmospheric pressure and usually contains some liquid, such as brake fluid. A restricted bypass through the piston unit throttles the flow of the gas and liquid between the closed end and rod end chambers, and a one-way open bypass defined by an annular clearance space between a perimeter wall of the piston unit and the tube adjacent the closed end chamber and at least one passage in the piston unit adjacent the rod end chamber allows essentially unrestricted fluid flow from the closed end chamber to the rod end chamber A sealing ring received in a ring groove in the piston unit intermediate the clearance space and passage and engaged in sealed and sliding relation with the inner wall of the tube is movable in the ring groove axially with respect to the tube between a sealed position in engagement with a ringland adjacent the clearance space such as to close the open bypass and an open position spaced apart from the ringland such as to open the bypass.

To enable the fluid in the closed end chamber to flow through the open bypass when the sealing ring is in the open position, the inner edge of the sealing ring is relatively widely spaced apart from the base of the ring groove to provide an annular flow passage that forms part of the open bypass—i.e., communicates the clearance space between the piston unit and the inner wall of the tube adjacent the closed end chamber with the passages in the piston unit adjacent the rod end chamber.

To ensure a good sealing engagement between the sealing ring and the ringland in the closed position of the sealing ring so that fluid does not leak through the open bypass when the rod is moving out and instead must flow through the restricted bypass, it is necessary for the outer circumference of the ringland to be in close clearance from the inner wall of the tube and for the radial dimension of the zone of engagement between the ringland and the sealing ring to exceed a certain value at all points circumferentially.

In many applications of gas springs the tube diameter must be kept as small as possible to conserve space. Keeping the diameter small presents various difficulties, such as providing an adequate land area width for the sealing ring and sufficient clearance between the piston and the tube to keep the piston from rattling against the tube wall

SUMMARY OF THE INVENTION

An object of the present invention is to provide a gas spring in which rattling of the piston against the tube is inhibited. Another object is to enable piston-rattling to be inhibited without requiring significant changes to be made in known and proven designs. It is also an objective to prevent rattling in gas springs of a small diameter, i.e., those in which constraints on dimensional relationships present special design problems. The present invention is a gas spring which is largely the same as presently known designs, such as the gas springs described and shown in the above-referred to patents. The invention is characterized in that the sealing ring has a serrated inner edge formed by spaced-apart internal projections and spaces between the projections defining with the base of the ring groove passages that constitute part of the open bypass when the sealing ring is in the open position The internal projections are in sufficient clearance with the base of the ring groove such that they do not bind or seize in the ring groove. At the same time, however, the projections are engageable by the base of the ring groove upon small deflections of the piston and resist lateral movement of the piston unit into contact with the inner wall of the tube under transient lateral loads. In preferred embodiments of the present invention, the projections have inner wall surfaces that are segments of a circular cylindrical surface that is concentric with the base of the ring groove For a better understanding of the present invention, reference may be made to the following description of an embodiment, taken in conjunction with the accompanying drawings.

DESCRIPTION OF THE DRAWINGS

FIG. 1 is an axial side cross-sectional view of the embodiment;

FIG. 2 is a transverse cross-sectional view taken along the line 2—2 in FIG. 1 and in the direction of the arrows; and FIG. 3 is a plan view of the sealing ring of the embodiment.

DESCRIPTION OF THE EMBODIMENT

The embodiment comprises a tube 10 that is closed at one end, such as by a cap 12 or a rolled closure formed on the tube, and receives through its other end a piston rod 14. The piston rod is slidably supported in the tube end and sealed to the tube, such as by a guide 16 and a main seal 18 retained in place by a retainer washer 20.

Affixed to end of the piston rod 14 within the tube 10 is a piston unit 22, which is a sub-assembly with the rod composed of a piston body 24, a plain, round washer 26, and a notched washer 28 (i.e., a washer having spaced-apart notches 30 along its perimeter). The piston body 24 has small grooves 32 and 34 in each of its end faces that in the assembled piston unit are closed off by the washers 26 and 28 to form a restricted bypass between the closed end chamber 36 defined within the tube 10 between the piston unit 22 and the cap 12 and the rod end chamber 38 defined within the tube by the seal 18 and the piston. The details of the restricted bypass are not described here and are not fully shown in the drawings—instead reference is made to the three patents referred to near the beginning of this specification, which patents are hereby incorporated herein by this reference to them. Suffice it to say here that the fluid contained in the gas spring can flow in both directions through the restricted bypass between the rod end chamber 38 and the closed end chamber 36, but the restricted bypass has a high flow resistance that throttles the rate of fluid flow. Accordingly, when the only way that fluid can flow between the chambers 36, 38 is via the restricted bypass, the velocity of the movement of the piston unit 22 and piston rod 14 along the tube is limited.

Because it is usually not desirable to retard significantly the movement of the rod/piston unit toward the closed end chamber ("rod-in movement") under a handle load applied to the load, the gas spring has an essentially open, one-way bypass through which fluid can flow with only a comparatively small restriction from the closed end chamber 36 to the rod end chamber 38. The open bypass comprises an annular clearance space between the larger diameter portion 40 of the piston body 24 and the inner wall of the tube 10 and the notches 30 of the notched washer 28. The open bypass is made one-way by a sealing ring 42 that is received in an axially over-sized ring groove formed in the piston unit by a smaller diameter portion 44 of the piston body 24 and by the projections 46 between the notches 30 of the notched washer 28. The sealing ring 42 functions as a one-way valve. Its outer edge is in sliding/sealing engagement with the inner wall of the tube 10, and the friction of that engagement produces a frictional force that moves the sealing ring to a closed position in sealing engagement with a ringland 48 of the ring groove formed by a shoulder between the larger and smaller diameters 40 and 44 of the piston body when the rod is being forced out of the tube by the gas pressure ("rod-out movement"). Upon rod-in movement of the rod/piston the frictional force on the seal moves it in the ring groove to an open position spaced apart from the ringland 48, namely into the engagement with the projections 46 of the notched washer 28.

In the closed position it assumes upon rod-out movement of the rod/piston, the sealing ring forms with the ringland 48 a face seal that prevents fluid from flowing past the sealing ring to the annular clearance space between the portion 40 of the piston body and the tube, thereby closing the open bypass. Accordingly, the only way the fluid can flow past the piston from the rod end chamber to the closed end chamber is through the restricted bypass, and the speed of the rod-out movement is limited.

As described thus far, the embodiment is well-known to those skilled in the art from, for example, the three patents previously referred to. In some circumstances gas springs of the previous designs rattle as a result of transient side loads on the piston when the gas spring is inactive and the piston resides near the closed end. The sliding fit between the rod 14 and the rod guide 16 (or other mounting arrangement) allows the rod to cock slightly, and when the rod is in, even the slight cocking of the rod can be enough to allow contact of the piston with the tube.

To prevent rattling, the present invention provides a special sealing ring 42 that has a serrated inner edge constituted by spaced-apart internal projections 50. The spaces 52 between the projections 50 provide passages between the base 48 of the ring groove (the smaller diameter portion of the piston body) and the sealing ring 42 through which fluid can flow when the sealing ring is in the open position during rod-in movement The passages formed by the spaces 52 complete (form part of) the open bypass; fluid can flow without significant restriction through the annular clearance space between the larger diameter portion 40 of the piston body 24 and the inner wall of the tube, into the ring groove, through the spaces 52 and finally through the notches 30 in the notched washer 28.

The inner ends of the internal projections 50 of the serrated edge of the sealing ring 42 are in close clearance from the base 44 of the ring groove. In particular the internal ends have, in the embodiment and by preference according to the invention, surfaces that are segments of a circular cylindrical surface concentric with and of a diameter slightly greater than that of the base 44 of the ring groove. The clearance is necessary to prevent the sealing ring from binding with the ring groove base and seizing, but the clearance is close in order that under side loads acting on it the piston is inhibited from being forced out into contact with the tube by engagement with one or more of the projections 50 of the sealing ring—under side loads the piston is laterally supported by the sealing ring. The sealing ring is moderately resilient, so lateral movements of the piston unit are also dampened by the engagement.

There are three constraints on the dimensioning of the gas spring of the present invention:
(1) the close clearance between the ring groove base and the end surfaces of the sealing ring projections 50 should be such as to prevent the possibility of the sealing ring binding with the piston;
(2) the clearance between the larger diameter portion 40 of the piston and the inner wall of the tube 10 should be such as to ensure that the piston will not contact the tube without significant radial compression of the sealing ring; and
(3) the radial dimension of the face seal (engagement area) between the sealing ring 42 and the ringland 48 should be such as to ensure against leakage and, therefore, provide the desired dampening of rod out movement.

In fulfilling the above three constraints, the upper and lower temperature extremes in which the gas spring will be operating must be taken into account. Selection of the material of the sealing ring to meet the requirements for durability, resiliency and sealability is also important.

I claim:
1. A gas spring having an elongated tube that is closed at one end and receives a piston rod in sealed and sliding relation at the other end, a piston unit affixed to the piston rod within the tube and defining a closed end chamber within the tube adjacent said one end and a rod end chamber within the tube adjacent said other end, a gas contained in the tube at a pressure greater than atmospheric pressure, a restricted bypass through the piston unit adapted to conduct fluid between the closed end and rod end chambers with a substantial flow resistance to throttle the flow, a one-way open bypass defined by an annular clearance space between a perimeter wall of the piston unit and the tube adjacent the closed end chamber and at least one passage in the piston unit adjacent the rod end chamber, and a sealing ring received in a ring groove in the piston unit intermediate the clearance space and passage, engaged in sealed and sliding relation with the inner wall of the tube, and movable in the ring groove axially with respect to the tube between a sealed position in engagement with a ringland adjacent the clearance space such as to close the open bypass and an open position spaced apart from the ringland, characterized in that the sealing ring has a serrated inner edge formed by spaced-apart internal projections and spaces between the projections defining with the base of the ring groove passages that constitute part of the open bypass when the sealing ring is in the open position and in that the internal projections are in close clearance with the base of the ring grooves such that they do not bind with the base of the ring grove but such that under transient lateral loads on the piston unit the projections are engaged by the base of the ring groove upon lateral deflections of the piston unit and inhibit lateral movement of the piston unit into contact with the inner wall of the tube.

2. A gas spring according to claim 1 and further characterized in that the projections have inner end surfaces that are segments of a circular cylindrical surface that is concentric with the base of the ring groove.

3. A gas spring according to claim 2 and further characterized in that the close clearance between the projections and the base of the ring groove is such as to prevent binding between the sealing ring and the base of the ring groove.

4. A gas spring according to claim 3 and further characterized in that the annular clearance space is such as to ensure that the piston will not contact the tube without significant radial compression of the sealing ring.

5. A gas spring according to claim 4 and further characterized in that the radial dimensions of the spaces between the projections of the sealing ring are such that the zone of sealing engagement between the sealing ring and the ringland has a radial dimension such as to ensure against leakage.

* * * * *